US012766755B2

(12) United States Patent
Schlessmann et al.

(10) Patent No.: US 12,766,755 B2
(45) Date of Patent: Oct. 20, 2026

(54) PORTABLE WORK APPARATUS

(71) Applicant: Andreas Stihl AG & Co. KG, Waiblingen (DE)

(72) Inventors: Helmut Schlessmann, Berglen (DE); Tobias Spring, Gemmrigheim (DE); Matthias Brandt, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 147 days.

(21) Appl. No.: 18/774,566

(22) Filed: Jul. 16, 2024

(65) Prior Publication Data

US 2025/0026039 A1 Jan. 23, 2025

(30) Foreign Application Priority Data

Jul. 18, 2023 (DE) ..................... 10 2023 119 005.9

(51) Int. Cl.
*B27B 17/02* (2006.01)
*B27B 17/08* (2006.01)
*B27G 3/00* (2006.01)

(52) U.S. Cl.
CPC ............. *B27B 17/02* (2013.01); *B27B 17/08* (2013.01); *B27G 3/00* (2013.01)

(58) Field of Classification Search
CPC ............................... B27B 17/00; B27B 17/02
See application file for complete search history.

(56) References Cited

U.S. PATENT DOCUMENTS 5,718,050 A * 2/1998 Keller ...................... A01G 3/08 30/296.1
5,896,669 A * 4/1999 Uhl ......................... F16H 57/04 30/383
6,112,419 A * 9/2000 Uhl ..................... B27B 17/0008 30/381
2015/0273721 A1* 10/2015 Harer .................. B23D 59/006 30/383

FOREIGN PATENT DOCUMENTS

DE 197 53 360 A1 6/1999
JP 2014213514 A * 11/2014 ............ B27B 17/00

* cited by examiner

*Primary Examiner* — Jennifer S Matthews
(74) *Attorney, Agent, or Firm* — Walter Ottesen, P.A.

(57) ABSTRACT

A portable work apparatus has a housing, a drive motor arranged in the housing, a guide bar with a longitudinal center axis, and a saw chain. The drive motor drives the saw chain in a rotating manner in a guide groove of the guide bar via a drive sprocket. A longitudinal plane of the guide bar is spanned by the guide groove. A discharge opening for discharging chips from the sprocket area into the outside surroundings is formed on the housing. The discharge opening has a first section formed on the first longitudinal side of the chainsaw, and a height measured parallel to the longitudinal plane and perpendicularly to the longitudinal center axis of the guide bar. The height is at least 5 mm.

11 Claims, 3 Drawing Sheets

PORTABLE WORK APPARATUS

CROSS-REFERENCE TO RELATED APPLICATIONS

This application claims priority of German patent application no. 10 2023 119 005.9, filed Jul. 18, 2023, the entire content of which is incorporated herein by reference.

BACKGROUND

Portable work apparatuses, for example chainsaws, that have a discharge opening for chip removal from the sprocket area into the surroundings are known in the art. Typically, discharge openings of this kind are located on the bottom side of the portable work apparatus, that is, below the load strand of the saw chain. Furthermore, a work apparatus of this kind also includes a discharge opening on the front side of the apparatus. The saw chain is guided from the sprocket area into the surroundings through the discharge opening formed on the front side.

SUMMARY

It is an object of the disclosure to provide a portable work apparatus that allows for efficient chip removal.

This object is, for example, achieved by a portable work apparatus including: a housing; a drive motor arranged in the housing; a guide bar defining a longitudinal center axis; a saw chain; the drive motor being configured to drive the saw chain in a rotating manner in a guide groove of the guide bar via a drive sprocket; the guide bar defining a longitudinal plane which is spanned by the guide groove; the housing including a base body and a sprocket cover; the base body and the sprocket cover delimiting a sprocket area; the housing having a front side and a back side; the guide bar projecting from the housing on the front side; the housing having a first longitudinal side and a second longitudinal side connecting the front side and the back side of the housing; wherein a discharge opening for discharging chips from the sprocket area into outside surroundings is defined on the housing; the discharge opening having a first section formed on the first longitudinal side and a height measured parallel to the longitudinal plane and perpendicularly to the longitudinal center axis of the guide bar; and, wherein the height is at least 5 millimeters.

The portable work apparatus according to the disclosure includes a housing, a drive motor arranged in the housing, a guide bar with a longitudinal center axis, and a saw chain, wherein the drive motor drives the saw chain rotating in a guide groove of the guide bar via a drive sprocket, wherein a longitudinal plane of the guide bar is spanned by the guide groove, wherein the housing includes a base body and a sprocket cover, wherein the base body and the sprocket cover delimit a sprocket area, wherein the housing includes a front side and a back side, wherein the guide bar projects from the housing on the front side, wherein the housing has a first longitudinal side and a second longitudinal side connecting the front side and the back side of the housing, wherein the housing has, in particular, a top side and a bottom side, wherein a discharge opening for discharging sawdust from the sprocket area into the outside surroundings is formed on the housing, wherein the discharge opening has a first section formed on the first longitudinal side of the portable work apparatus, and a height h measured parallel to the longitudinal plane and perpendicular to the longitudinal center axis of the guide bar, wherein the height is at least 5 mm, in particular at least 7.5 mm, in particular at least 10 mm. In other words, the first section of the discharge opening has a height h which, in projection in the direction perpendicular to the longitudinal plane onto the longitudinal plane of the guide bar, is at least 5 mm, in particular at least 7.5 mm, preferably at least 10 mm.

It has been found that the lateral formation of the discharge opening on the housing allows for particularly efficient chip removal. This is especially advantageous for portable work apparatus with short guide bars, such as brush cutters, for example. With work apparatus of this kind, the operator often uses the entire length of the guide bar, submerging it fully into the workpiece. If the front side of the housing comes into contact with the workpiece, this can lead to the closure of a discharge opening formed on the front side of the housing. Optimum chip removal is no longer possible. The lateral arrangement of the discharge opening allows chips to be discharged to the outside surroundings through the discharge opening, even when the front side of the brush cutter is in contact with the workpiece. Furthermore, the lateral arrangement of the discharge opening has proved particularly advantageous for longitudinal wood cuts too. The chips produced with longitudinal cuts are particularly long, making them difficult to discharge. In this case, the lateral discharge opening arranged on the housing has proved particularly advantageous.

It is particularly provided that the discharge opening is at least partially formed by a cutout in the sprocket cover. Therefore, chip removal from the sprocket area to the outside surroundings occurs primarily via the sprocket cover. It is particularly provided that the guide bar has a longitudinal top side and a longitudinal bottom side opposite the longitudinal top side relative to the longitudinal center axis, wherein the discharge opening is arranged in the region of the longitudinal top side of the guide bar. Consequently, the discharge opening is arranged on the slack strand side of the saw chain.

The first section of the discharge opening has, in particular, a length measured in the direction of the longitudinal center axis that is greater than the height of the discharge opening. The first section of the discharge opening, when viewed in the direction of the sprocket cover perpendicular to the longitudinal plane of the guide bar, is particularly substantially rectangular. This ensures that the first section of the discharge opening is sufficiently large to allow chip removal via the longitudinal side of the housing. In an alternative embodiment, the discharge opening may also have a shape, for example the discharge opening in the form of a triangle may open towards the guide bar.

It is particularly provided that the discharge opening is configured in such a manner that the first section of the discharge opening extends in the direction of the longitudinal center axis of the guide bar from a first end to a second end, wherein the discharge opening is configured in such a manner that, when viewed towards the sprocket cover perpendicular to the longitudinal plane of the guide bar, the saw chain is covered between the first end and the second end of the first section of the discharge opening by the housing, in particular by the sprocket cover, over at least 50%, in particular over at least 65%, in particular over at least 80%, of the length, and quite particularly over the entire extent of the first section of the discharge opening.

It is particularly provided that the covering area projects at least 1.0 mm beyond the saw chain in a direction away from the longitudinal center axis of the guide bar, perpendicular to the longitudinal center axis of the guide bar, and parallel to the longitudinal plane of the guide bar. In other words, the covering area projects at least 1.0 mm beyond the saw chain in a projection view perpendicular to the longitudinal plane onto the longitudinal plane of the guide bar, away from the longitudinal center axis of the guide bar.

It is particularly provided, in particular, that in the region of the discharge opening, the housing tapers, particularly conically, towards the front side of the housing, wherein in the second section of the discharge opening at the first end of the discharge opening, another cutout is provide provided on the housing, particularly on the sprocket cover, which exposes the saw chain when viewed towards the sprocket cover perpendicular to the longitudinal plane of the guide bar. The conical configuration of the housing towards the front side of the housing allows for a slender configuration of the housing at the front side. This ensures high accessibility to the workpiece with the work apparatus. This is particularly advantageous when removing the branches from trees. The additional cutout enlarges the discharge opening, particularly on the front side of the housing. In this way, the narrowing of the discharge opening resulting from the conicity of the housing towards the front side can be compensated for. The discharge opening is therefore sufficiently large to ensure adequate chip removal.

It is advantageously provided that the discharge opening includes a second section formed on the front side of the housing. Chips can therefore leave the sprocket area through the first section of the discharge opening on the first longitudinal side of the housing and through the second section of the discharge opening on the front side of the housing. The second section of the discharge arrangement, viewed towards the front side of the work apparatus in the direction of the longitudinal center axis, preferably has a minimum width measured perpendicularly to the longitudinal plane of the guide bar. The minimum width of the second section of the discharge opening is at least 10%, preferably at least 20%, more preferably at least 30%, of the width of the housing at the front side, measured perpendicularly to the longitudinal plane of the guide bar. The minimum width of the second section of the discharge opening is, in particular, no greater than 50% of the width of the housing at the front side.

Particularly preferably, the work apparatus has an additional discharge opening, wherein the additional discharge opening is preferably formed on the bottom side of the housing. This allows a plurality of saw chips transported into the sprocket area by the saw chain to be ejected into the outside surroundings through the additional discharge opening, preferably still in the region of the load strand.

It is particularly provided that the drive motor is an electric motor.

BRIEF DESCRIPTION OF DRAWINGS

The invention will now be described with reference to the drawings wherein.

DETAILED DESCRIPTION

Figure 1:
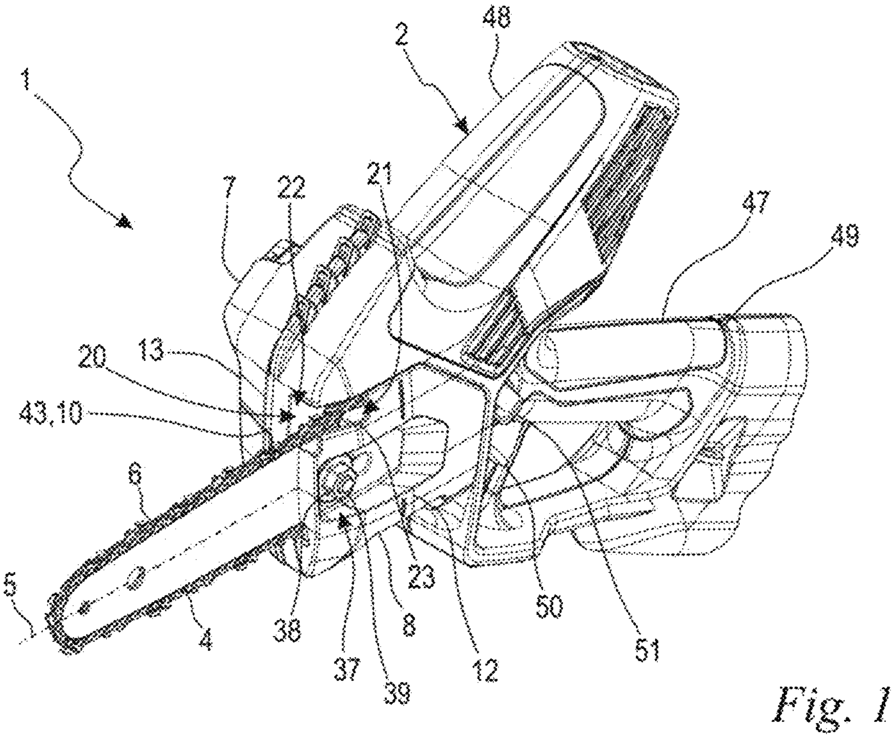
FIG. 1 shows a perspective view of an embodiment of the work apparatus according to the disclosure with a discharge opening with a first section on the first longitudinal side of the housing and a second section on the front side of the housing.

An embodiment of a portable, handheld work apparatus 1 according to the disclosure is shown in FIG. 1. The term "portable" should be understood to mean that, in the intended operation of the work apparatus 1, the work apparatus 1 is carried by the operator. In the embodiment, the work apparatus 1 is configured as a brush cutter. A brush cutter is preferably provided for cutting branches and small trees. The preferred use of a brush cutter is particularly the pruning of trees. The work apparatus 1 can also be configured as a chainsaw. In an alternative embodiment, the work apparatus 1 may also have a shaft and be configured, for example, as a pole pruner, tree care saw, or the like.

The work apparatus 1 includes a housing 2. The work apparatus 1 includes a drive motor 3. The drive motor 3 is arranged in the housing 2. Furthermore, the work apparatus 1 includes a saw chain 6. The saw chain 6 is driven by the drive motor 3. The saw chain 6 is driven in a rotating manner in a guide groove of a guide bar 4. The drive motor 3 drives a drive sprocket, not shown in greater detail, via its drive shaft, which in turn drives the saw chain 6 around the guide bar 4 in a running direction 33. The housing 2 includes a base body 7 and a sprocket cover 8. The sprocket cover 8 is arranged on the base body 7 and covers the drive sprocket.

Figure 2:
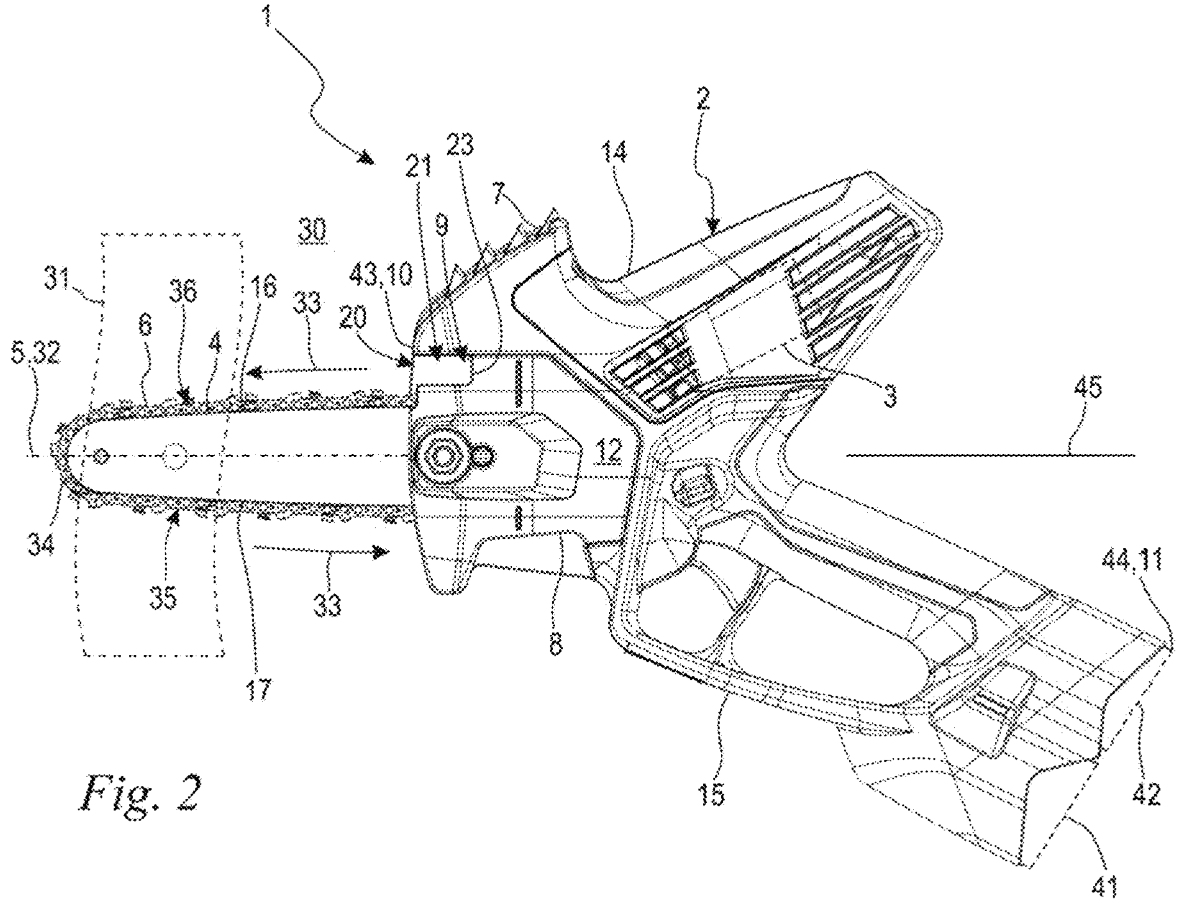
FIG. 2 shows a side view of the work apparatus according to FIG. 1.

As shown in FIGS. 1 and 2, the guide bar has a redirection section 34 that faces away from the housing 2. The saw chain 6 has a first strand 35, a so-called load strand, which moves in the running direction 33 from the redirection section 34 to the drive sprocket. The saw chain 6 has a second strand 36, a so-called slack strand, which moves from the drive sprocket to the redirection section 34.

As shown in FIG. 2, the drive motor 3 in the embodiment is configured as an electric motor. The work apparatus 1 includes, in particular, at least one first battery pack 41 only shown schematically. The first battery pack 41 is provided to supply the drive motor 3 with electrical energy. The work apparatus 1 includes, in particular, a second battery pack 42 only shown schematically. The second battery pack 42 is provided to supply the drive motor 3 with electrical energy. The work apparatus 1, in particular the drive motor 3 of the work apparatus 1, can also be operated exclusively by one of the two battery packs 41, 42, in particular. In the embodiment, the two battery packs 41, 42 are particularly connected in series. In an alternative configuration of the work apparatus 1, the drive motor 3 can also be configured as a combustion engine.

Figure 3:
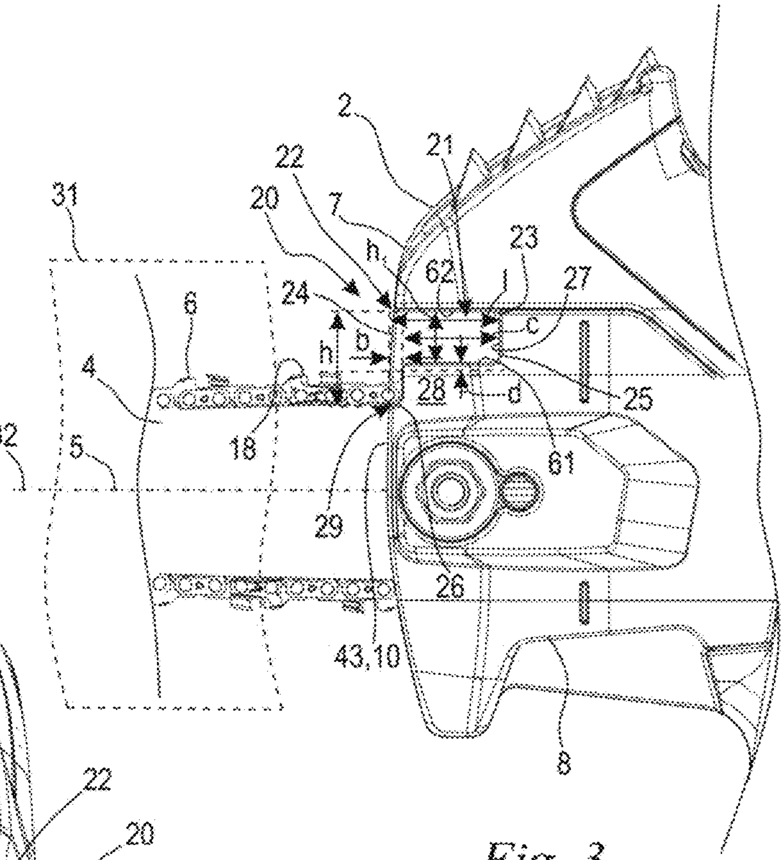
FIG. 3 shows the discharge opening for chip removal of the work apparatus according to FIG. 1 as a detailed side view.

As shown in FIGS. 2 and 3, the guide bar 4 includes a longitudinal center axis 5. Furthermore, the work apparatus 1 includes a longitudinal plane 31 which is spanned by the guide groove of the guide bar 4. The longitudinal center axis 5 of the guide bar 4 lies in the longitudinal plane 31. The longitudinal center axis 5 runs centrally through the guide bar 4, as a result of which the guide bar 4 is divided into two approximately equal parts by the longitudinal center axis 5 when viewed perpendicularly to the longitudinal plane 31 of the guide bar 4. Furthermore, the guide bar 4 includes a transverse plane 32. The transverse plane 32 is oriented orthogonally to the longitudinal plane 31 of the guide bar 4. The longitudinal center axis 5 lies in the transverse plane 32.

Figure 4:
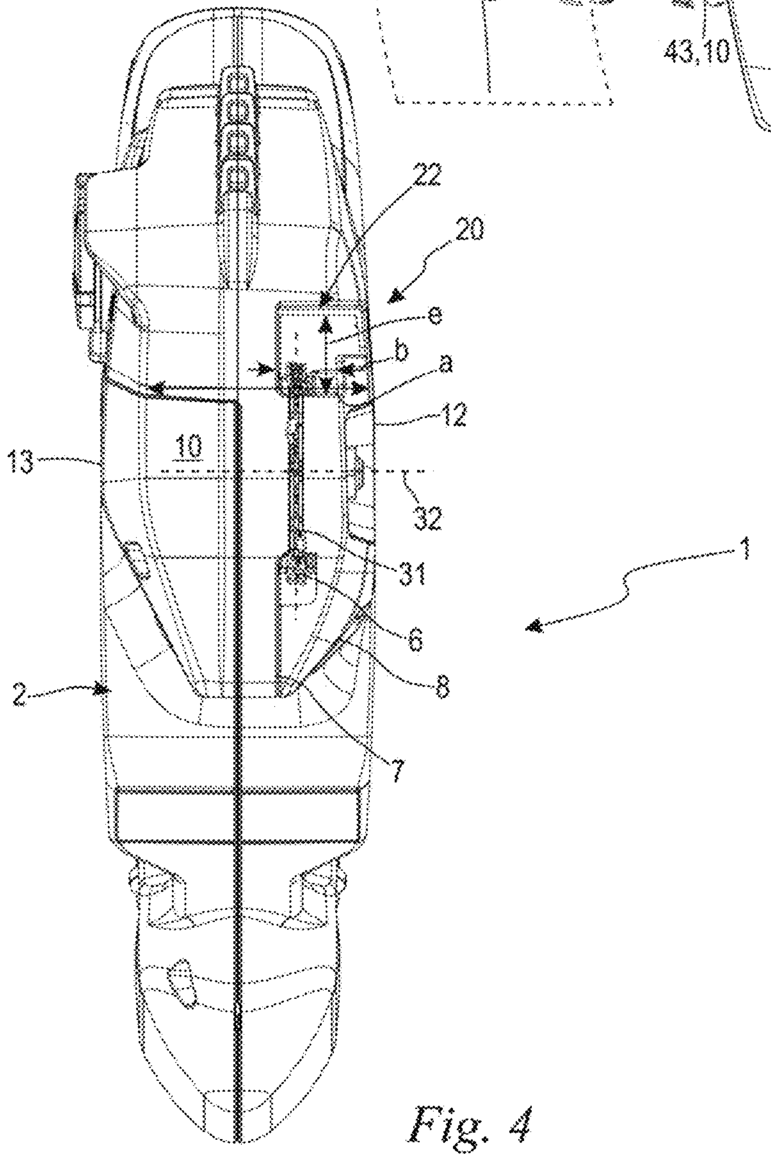
FIG. 4 shows the work apparatus according to FIG. 1 in a view from the front.
Figure 5:
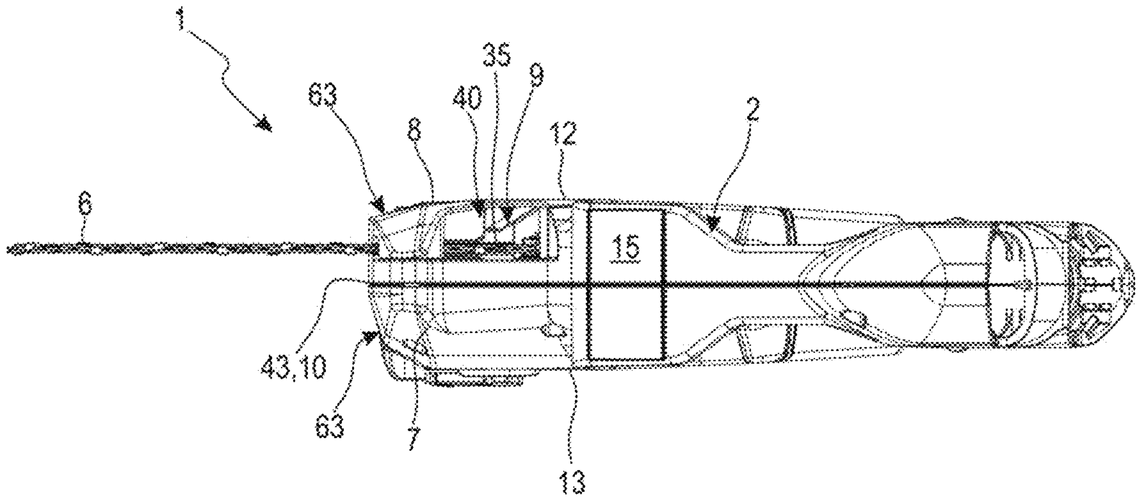
FIG. 5 shows the work apparatus according to FIG. 1 with an additional discharge opening for chip removal in a view from below; and, FIG. 6 shows the work apparatus according to FIG. 1 in a view from above.
Figure 6:
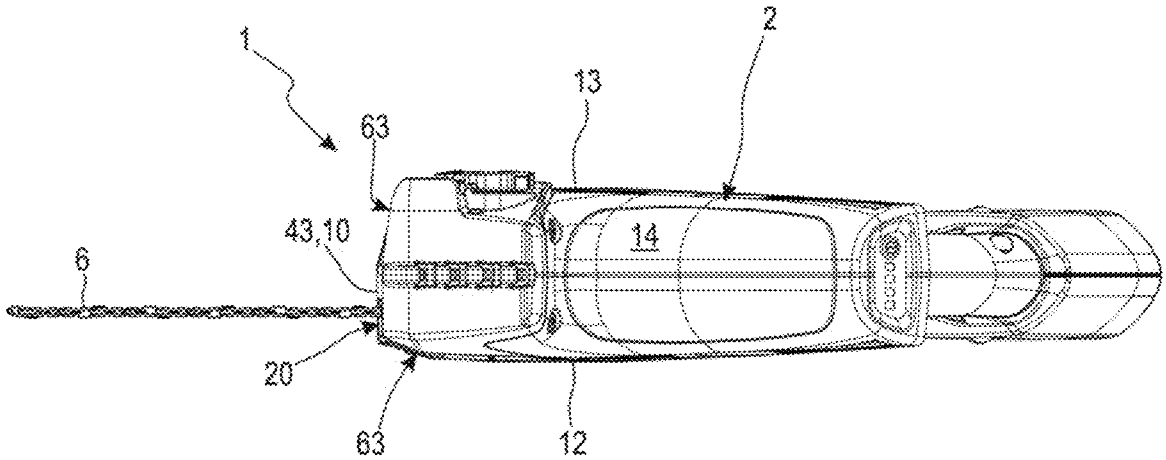

As shown in FIG. 2, the housing 2 of the work apparatus 1 includes a front end 43 and a rear end 44. The front end 43 corresponds to a front side 10 of the housing 2. The guide bar 4 is fixed to the housing 2 and projects from the front side 10 of the housing 2. The rear end 44 corresponds to the back side 11 of the housing 2. The rear end 44 is formed by the battery packs 41, 42 in the present embodiment. In an alternative embodiment, the rear end 44 can also be formed by a handle of the work apparatus 1. The housing 2 has a first longitudinal side 12 and a second longitudinal side 13 (FIGS. 4 to 6). The first longitudinal side 12 and the second longitudinal side 13 are connected to one another via the front side 10 and the back side 11 of the housing 2.

As shown in FIG. 2, the housing 2 has a top side 14 and a bottom side 15. The first longitudinal side 12 and the second longitudinal side 13 are connected to one another by the top side 14 and the bottom side 15. The first longitudinal side 13 and the second longitudinal side 14 extend substantially in the direction of the longitudinal plane 31 of the guide bar 4.

The terms "top" and "bottom" relate to an orientation of the work apparatus 1 in which the longitudinal center axis 5 of the guide bar 4 lies in a horizontal plane 45 and the longitudinal plane 31 of the guide bar 4 is oriented perpendicularly to the horizontal plane 45. An orientation of the work apparatus 1 of this kind is shown in FIG. 2. In this orientation, the first strand 35 of the saw chain 6 is arranged on a longitudinal bottom side 17 of the guide bar 4, and the second strand 36 of the saw chain 6 is arranged on a longitudinal top side 16 of the guide bar 4. The viewing direction of the longitudinal top side 16 of the guide bar 4 naturally also corresponds to the viewing direction of the top side 14 of the housing 2. A viewing direction of this kind is shown in FIG. 6. The viewing direction to the longitudinal bottom side 17 of the guide bar 4 also corresponds to the viewing direction to the bottom side 15 of the housing 2. A viewing direction of this kind is shown in FIG. 5, for example.

As shown in FIGS. 1 and 2, the work apparatus 1 includes a first handle 47 for the operator's hand to rest on. The first handle 47 is formed on a handle housing 49. The handle housing 49 is part of the housing 2. The work apparatus 1 includes a control element 50 for operating the drive motor 3. The control element 50 is assigned to the first handle 47, meaning that in the intended operation of the work apparatus 1, the operator operates the control element 50 with their hand resting on the first handle 47. The work apparatus 1 includes a preferably mechanical locking element 51. The locking element 51 is preferably configured as a locking lever. The locking element 51 is configured to lock the control element 50 in a locked position, preferably mechanically, and to release it in an operating position. If the operator wants to actuate the control element 50, they must first unlock the control element 50 by actuating the locking element 51. Subsequently, the operator can actuate the control element 50 and control the drive motor 3.

As shown in FIGS. 1 and 2, the work apparatus 1 includes a second handle 48 in addition to the first handle 47. The second handle 48 is used to support the operator's other hand and enables the operator to better guide the work apparatus 1. The second handle 48 is provided on the housing 2, in particular in the region of the drive motor 3.

As shown in FIG. 1, the work apparatus 1 includes a fastening device 37 for securing the guide bar 4. In an operating state of the fastening device 37, the guide bar 4 is clamped to the housing 2. In a released state of the fastening device 37, the guide bar 4 is slidable relative to the housing 2 in the direction of the longitudinal center axis 5. The guide bar 4 can be pushed away from the housing 2 in the direction of its longitudinal center axis 5, thereby tensioning the saw chain 6. The sprocket cover 8 is part of the fastening device 37. In the fixed state of the fastening device 37, the guide bar 4 is clamped between the sprocket cover 8 and the base body 7. A nut 38 is provided to secure the sprocket cover 8 to the housing 2. The nut 38 is screwed onto a bolt 39 that is fixedly connected to the housing 2. By tightening the nut 38, the sprocket cover 8 is pressed against the guide bar 4, and the guide bar 4 is pressed against the base body 7. The sprocket cover 8 covers the drive sprocket driven by the drive motor 3. The sprocket cover 8 is provided particularly on the first longitudinal side 12 of the housing 2.

As shown in FIGS. 1 and 2, the work apparatus 1 includes a discharge opening 20 for ejecting chips from the sprocket chamber 9 into the outside surroundings 30. The sprocket chamber 9 is bounded by the base body 7 and the sprocket cover 8. The discharge opening 20 is formed as a through-opening in the housing 2, particularly in the sprocket cover 8, through which chips can be ejected from the sprocket chamber 9 into the outside surroundings 30 via the discharge opening 20. The drive sprocket is arranged in the sprocket chamber 9. The saw chain 6 enters the sprocket chamber in the region of the first strand 35, is deflected by the drive sprocket, and then exits the sprocket chamber 9 back into the outside surroundings 30 in the region of the second strand 36.

As shown in FIGS. 1 and 2, the discharge opening 20 is formed at least partially on the first longitudinal side 12 of the housing 2, allowing the chips to be expelled from the sprocket chamber 9 through the first longitudinal side 12 of the housing 2. The discharge opening 20 is arranged in the region of the second strand 36. In other words, the discharge opening 20 is located in the region of the guide bar 4, from which the saw chain 6 exits the housing 2.

Furthermore, the discharge opening 20 is arranged in the region of the longitudinal top side 16 of the guide bar 4. In an alternative embodiment, the discharge opening is arranged in the region of the first strand 35, that is, in the region of the longitudinal bottom side 17 of the guide bar 4.

In the present embodiment of the work apparatus 1, as shown in FIG. 5, an additional discharge opening 40 is provided. The additional discharge opening 40 is provided on the bottom side 15 of the housing 2, particularly of the sprocket cover 8. Consequently, the chips can be expelled downwards from the sprocket chamber 9 through the additional discharge opening 40. The additional discharge opening 40 is formed in the region of the first strand 35. In other words, the additional discharge opening 40 is located in the region of the guide bar in which the saw chain 6 runs in the sprocket chamber towards the drive sprocket. The additional discharge opening 40 is only formed on the bottom side 15 of the housing 2 in the embodiment. In an alternative embodiment of the work apparatus 1, it can also be provided that the additional discharge opening 40 is formed at least partially, in particular completely, on the first longitudinal side 12 of the housing 2.

As shown in FIG. 1, the discharge opening 20 has a first section 21 and a second section 22. The first section 21 of the discharge opening 20 is formed on the first longitudinal side 12 of the housing 2. The second section 22 is formed on the front side 10 of the housing 2. In the embodiment, the first section 21 and the second section 22 merge with one another particularly directly, as a result of which the two sections 21, 22 form a single opening, namely the discharge opening 20. The saw chain 6 is guided outwards from the sprocket chamber 9 through the second section 22 of the discharge opening 20. The discharge opening 20 is substantially formed by a cutout 23 on the sprocket cover 8. In the embodiment, the first section 21 of the discharge opening 20 is solely formed by the cutout 23 of the sprocket cover 8. The second section 22 of the discharge opening 20 is at least partially formed by the cutout 23 of the sprocket cover 8. The second section 22 of the discharge opening 20 is also at least partially formed by a cutout on the front side 10 of the base body 7.

As shown in FIG. 3, the first section 21 of the discharge opening 20 has a substantially rectangular contour viewed in the direction of the sprocket cover 8 perpendicularly to the longitudinal plane 31. In other words, the first section 21 of the discharge opening 20 has a rectangular contour in the projection towards the sprocket cover perpendicularly to the longitudinal plane 31 onto the longitudinal plane 31. Other contours that form a sufficiently large opening for chip removal are also conceivable as an alternative. The first section 21 has a height h measured parallel to the longitudinal plane 31 and perpendicular to the longitudinal center axis 5 of the guide bar 4. In other words, the height h is measured perpendicularly to the transverse plane 32. The height h of the first section 21 of the discharge opening 20 is at least 5 mm, particularly at least 7.5 mm, preferably at least 10 mm. The height h of the first section 21 of the discharge opening 20 corresponds to a distance between a lower edge 61 of the discharge opening 20 and an upper edge 62 of the discharge opening 20. In the present embodiment, the lower edge 61 of the discharge opening 20 is formed by the sprocket cover 8. The upper edge 62 is formed on the base body 7 in the present embodiment. Consequently, the discharge opening 20 is bounded upwards by the housing 2. In the embodiment, the work apparatus 1 configured as a brush cutter includes a lubrication tank that forms the upper edge 62 of the discharge opening 20. The lubrication tank is part of the housing 2, particularly of the base body 7. Consequently, the discharge opening 20 is bounded upwards by the lubrication tank in the present case.

As shown in FIG. 3, the first section 21 of the discharge opening 20 extends from a first end 24 in the direction of the longitudinal center axis 5 to a second end 25. The first end 24 is formed at the front end 43 of the housing 2, that is, at the front side 10 of the housing 2. The second end 25 of the section 21 is formed by a high edge 27 at the cutout 23 of the sprocket cover 8. The first section 21 of the discharge opening 20 has a length l measured in the direction of the longitudinal center axis 5, corresponding to the distance between the first end 24 of the first section 21 and the second end 25 of the first section 21. In the embodiment, the length l of the first section 21 of the discharge opening 20 is greater than the height h of the first section 21 of the discharge opening 20. The length l of the first section 21 is at least 10 mm, preferably at least 15 mm.

As shown in FIG. 3, the housing 2, in particular the sprocket cover 8, has a cover area 28 between the first end 24 of the first section 21 and the second end 25 of the first section 21. In the cover area 28, the saw chain 6 is covered by the housing 2, in particular by the sprocket cover 8, when viewed in the direction of the sprocket cover 8 perpendicularly to the longitudinal plane 31 of the guide bar 4. In the cover area 28, the lower edge 61 of the first section 21 of the discharge opening 20 is formed above the longitudinal top side 16 of the guide bar 4, in particular above the saw chain 6, when viewed in the direction of the sprocket cover 8 perpendicularly to the longitudinal plane 31. The discharge opening 20 has a height $h_1$ in the cover area 28 of the first section 21 measured parallel to the longitudinal plane 31 and perpendicularly to the longitudinal center axis 5 of the guide bar 4. In other words, the height $h_1$ of the discharge opening 20 in the cover area 28 is measured perpendicularly to the transverse plane 32. The height $h_1$ of the discharge opening 20 in the cover area 28 is at least 5 mm, in particular at least 7.5 mm, preferably at least 10 mm. The height $h_1$ of the discharge opening 20 in the cover area 28 is at most 30 mm, in particular at most 20 mm, quite particularly at most 15 mm.

As shown in FIG. 3, the housing 2, in particular the sprocket cover 8, has an open area 29 between the first end 24 of the first section 21 and the second end 25 of the first section 21. The open area 29 is formed by another cutout 26 in the sprocket cover 8. In the open area 29, the saw chain 6 is exposed by the additional cutout 26 in the sprocket cover 8 when viewed in the direction of the sprocket cover 8 perpendicularly to the longitudinal plane 31 of the guide bar 4. In the open area 29, the lower edge 61 of the first section 21 of the discharge opening 20 is formed below an upper side 18 of the saw chain 6 facing away from the guide bar 4 when viewed in the direction of the sprocket cover 8 perpendicularly to the longitudinal plane 31. In the present embodiment, the open area 29 begins immediately at the front side 10 of the housing 2, in particular the sprocket cover 8. The open area 29 extends from the front side 10 of the housing 2 to the cover area 28 over a length b measured in the direction of the longitudinal center axis 5 of the guide bar 4. The length b of the open area 29 is, in particular, less than 5 mm. In an alternative embodiment of the work apparatus 1, no additional cutout 26 is provided. In an embodiment of this kind, the housing 2, in particular the sprocket cover 8, has no open area 29, but simply a cover area 28.

As shown in FIG. 3, the discharge opening 20 is configured in such a manner that, when viewed in the direction of the sprocket cover 8 perpendicularly to the longitudinal plane 31 of the guide bar 4, the saw chain 6 is covered between the first end 24 and the second end 25 of the first section 21 of the discharge opening 20 by the housing 2, in particular by the sprocket cover 8, over at least 50%, in particular over at least 65%, in particular over at least 80% of the length l of the first section 21 of the discharge opening 20. Accordingly, a length c of the cover area 28 measured in the direction of the longitudinal center axis 5 of the guide bar 4 is at least 50%, in particular at least 65%, preferably at least 80%, of the length l of the first section 21 of the discharge opening 20. In the cover area, the distance d between the lower edge 61 of the discharge opening 20 in the first section 21 and the upper side 18 of the saw chain 6 is at least 1 mm, preferably at least 2 mm, in particular at least 3 mm.

As shown in FIG. 4, the second section 22 of the discharge opening 20, viewed towards the front side 10 of the work apparatus 1 in the direction of the longitudinal center axis 5, has a minimum width b measured perpendicularly to the longitudinal plane 31 of the guide bar 4. The minimum width b is at least 10%, preferably at least 20%, more preferably at least 30%, of the width a of the housing 2 measured perpendicularly to the longitudinal plane 31 of the guide bar 4 at the front side 10 in the area of the discharge opening 20. The width a of the housing 2 corresponds to the distance between the first longitudinal side 12 and the second longitudinal side 13 at the front side 10 of the housing 2 in the region of the discharge opening 20. The minimum width b of the second section 22 of the discharge opening 20 is at least 10 mm, preferably at least 12.5 mm, in particular at least 15 mm. The height e of the second section 22 of the discharge opening 20 measured perpendicularly to the transverse plane 32 is at least 10 mm, preferably at least 15 mm, in particular at least 20 mm.

As shown in FIGS. 5 and 6, the housing 2 tapers towards the front side 10 of the housing 2 in the region of the discharge opening 20. The housing 2 has a conical shape 63, in particular, in the region of the discharge opening 20. The housing 2 tapers conically towards the front side 10 of the housing 2 in the region of the discharge opening 20. The additional cutout 26 in the first section 21 of the discharge opening 20 at the first end 24 of the discharge opening 20 leads to an increase in the minimum width b of the second section 22 of the discharge opening 20 (FIG. 4).

It is understood that the foregoing description is that of the preferred embodiments of the invention and that various changes and modifications may be made thereto without departing from the spirit and scope of the invention as defined in the appended claims.

The invention claimed is:

1. A portable work apparatus comprising:

a housing;

a drive motor arranged in said housing;

a guide bar defining a longitudinal center axis;

a saw chain;

said drive motor being configured to drive said saw chain in a rotating manner in a guide groove of said guide bar via a drive sprocket;

said guide bar defining a longitudinal plane which is spanned by the guide groove;

said housing including a base body and a sprocket cover;

said base body and said sprocket cover delimiting a sprocket area;

said housing having a front side and a back side;

said guide bar projecting from said housing on said front side;

said housing having a first longitudinal side and a second longitudinal side connecting said front side and said back side of said housing;

wherein a discharge opening for discharging chips from said sprocket area into outside surroundings is defined on said housing;

said discharge opening having a first section formed on said first longitudinal side and a height measured parallel to said longitudinal plane and perpendicularly to said longitudinal center axis of said guide bar;

wherein said height is at least 5 millimeters;

said first section of the discharge opening having a length measured in a direction of said longitudinal center axis that is greater than said height of said discharge opening;

said discharge opening being configured such that said first section of said discharge opening extends from a first end in the direction of said longitudinal center axis of said guide bar to a second end; and, said discharge opening being configured such that when viewed in a direction of said sprocket cover perpendicularly to said longitudinal plane of said guide bar, said saw chain is covered between said first end and said second end of said first section of said discharge opening over at least 50% of said length of said first section of said discharge opening by a cover area of said housing.

2. The portable work apparatus of claim 1, wherein said discharge opening is at least partially formed by a cutout in said sprocket cover.

3. The portable work apparatus of claim 1, wherein said guide bar has a longitudinal top side and a longitudinal bottom side opposite said longitudinal top side relative to said longitudinal center axis; and, said discharge opening is arranged in a region of said longitudinal top side of said guide bar.

4. The portable work apparatus of claim 1, wherein said cover area projects at least 1.0 millimeters beyond said saw chain in a direction away from said longitudinal center axis of said guide bar, perpendicular to said longitudinal center axis of said guide bar, and parallel to said longitudinal plane of said guide bar.

5. The portable work apparatus of claim 1, wherein said housing tapers towards said front side of said housing in a region of said discharge opening; and, in said first section of said discharge opening at said first end of said discharge opening, another cutout is defined on said housing, which exposes said saw chain when viewed towards said sprocket cover perpendicularly to said longitudinal plane of said guide bar.

6. The portable work apparatus of claim 1, wherein said housing has a top side and a bottom side.

7. The portable work apparatus of claim 6, wherein the portable work apparatus defines an additional discharge opening on said bottom side of said housing.

8. The portable work apparatus of claim 1, wherein said drive motor is an electric motor.

9. A portable work apparatus comprising:

a housing;

a drive motor arranged in said housing;

a guide bar defining a longitudinal center axis;

a saw chain;

said drive motor being configured to drive said saw chain in a rotating manner in a guide groove of said guide bar via a drive sprocket;

said guide bar defining a longitudinal plane which is spanned by the guide groove;

said housing including a base body and a sprocket cover;

said base body and said sprocket cover delimiting a sprocket area;

said housing having a front side and a back side;

said guide bar projecting from said housing on said front side;

said housing having a first longitudinal side and a second longitudinal side connecting said front side and said back side of said housing;

wherein a discharge opening for discharging chips from said sprocket area into outside surroundings is defined on said housing;

said discharge opening having a first section formed on said first longitudinal side and a height measured parallel to said longitudinal plane and perpendicularly to said longitudinal center axis of said guide bar;

wherein said height is at least 5 millimeters; and, wherein said discharge opening includes a second section formed on said front side of said housing.

10. The portable work apparatus of claim 9, wherein said second section of said discharge opening, viewed towards said front side in the direction of said longitudinal center axis, has a minimum width measured perpendicularly to said longitudinal plane of said guide bar that is at least 10% of a width of said housing at said front side measured perpendicularly to said longitudinal plane of said guide bar.

11. A portable work apparatus comprising:

a housing;

a drive motor arranged in said housing;

a guide bar defining a longitudinal center axis;

a saw chain;

said drive motor being configured to drive said saw chain in a rotating manner in a guide groove of said guide bar via a drive sprocket;

said guide bar defining a longitudinal plane which is spanned by the guide groove;

said housing including a base body and a sprocket cover;

said base body and said sprocket cover delimiting a sprocket area;

said housing having a front side and a back side;

said guide bar projecting from said housing on said front side;

said housing having a first longitudinal side and a second longitudinal side connecting said front side and said back side of said housing;

wherein a discharge opening for discharging chips from said sprocket area into outside surroundings is defined on said housing;

said discharge opening having a first section formed on said first longitudinal side and a height measured parallel to said longitudinal plane and perpendicularly to said longitudinal center axis of said guide bar;

wherein said height is at least 5 millimeters; and, wherein the portable work apparatus defines an additional discharge opening.

* * * * *